United States Patent
Keller et al.

(10) Patent No.: US 10,502,643 B2
(45) Date of Patent: Dec. 10, 2019

(54) RESISTIVE-CAPACITIVE DEFORMATION SENSOR

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/055,376

(22) Filed: Aug. 6, 2018

(65) Prior Publication Data

US 2018/0372562 A1   Dec. 27, 2018

Related U.S. Application Data

(63) Continuation of application No. 14/843,067, filed on Sep. 2, 2015, now Pat. No. 10,067,007.

(51) Int. Cl.
   *G01L 1/22* (2006.01)
   *G01L 1/14* (2006.01)
   *G01B 7/16* (2006.01)

(52) U.S. Cl.
   CPC ............... *G01L 1/142* (2013.01); *G01B 7/18* (2013.01); *G01B 7/22* (2013.01); *G01L 1/22* (2013.01); *G01L 5/165* (2013.01)

(58) Field of Classification Search
   None
   See application file for complete search history.

(56) References Cited

U.S. PATENT DOCUMENTS

| | | | |
|---|---|---|---|
| 3,278,881 A | 10/1966 | Anderson et al. | |
| 4,577,513 A * | 3/1986 | Harwood | G01L 3/1457 414/730 |
| 6,360,615 B1 | 3/2002 | Smela | |
| 6,568,275 B2 | 5/2003 | Scholz et al. | |
| 6,701,296 B1 * | 3/2004 | Kramer | A61B 5/6806 370/545 |

(Continued)

FOREIGN PATENT DOCUMENTS

| | | |
|---|---|---|
| CN | 103959029 A | 7/2014 |
| CN | 104321874 A | 1/2015 |
| KR | 10-2014-0022180 A | 2/2014 |

OTHER PUBLICATIONS

Extended European Search Report, European Application No. 16842652. 6, dated Sep. 12, 2018, 8 pages.

(Continued)

*Primary Examiner* — Peter J Macchiarolo
*Assistant Examiner* — Jermaine L Jenkins
(74) *Attorney, Agent, or Firm* — Fenwick & West LLP

(57) ABSTRACT

A deformation sensing apparatus comprises an elastic substrate, a first strain-gauge element formed on a first surface of the elastic substrate, and configured to output a first signal in response to a strain applied in a first direction, and a second strain-gauge element formed on a second surface of the elastic substrate opposite to the first surface, and configured to output a second signal in response to a strain applied in the same first direction.

20 Claims, 11 Drawing Sheets

(56) References Cited

U.S. PATENT DOCUMENTS

| | | |
|---|---|---|
| 7,255,011 B2 | 8/2007 | Morimoto |
| 7,726,199 B2 | 6/2010 | Shkel et al. |
| 7,750,790 B2 | 7/2010 | Yang |
| 8,032,199 B2 | 10/2011 | Linti |
| 8,079,269 B2 | 12/2011 | Chakraborty |
| 8,191,433 B2 | 6/2012 | Tao |
| 8,220,343 B2* | 7/2012 | Hatanaka ............... G01L 5/223 |
| | | 73/862.044 |
| 8,342,031 B2 | 1/2013 | Jamshidi et al. |
| 8,661,915 B2 | 3/2014 | Taylor |
| 8,872,187 B2 | 10/2014 | Friedberger et al. |
| 9,119,916 B2 | 9/2015 | Heppe |
| 9,138,170 B2* | 9/2015 | Huang ............... A61B 5/1038 |
| 9,476,692 B2* | 10/2016 | Reese ............... A61B 5/1071 |
| 9,529,433 B2* | 12/2016 | Shankar ............... G06F 3/014 |
| 9,612,102 B2* | 4/2017 | Reese ............... G01B 7/22 |
| 2002/0070840 A1 | 6/2002 | Fischer et al. |
| 2010/0002402 A1 | 1/2010 | Rogers et al. |
| 2010/0036287 A1 | 2/2010 | Weber |
| 2013/0134992 A1 | 5/2013 | Zhu et al. |
| 2014/0090488 A1 | 4/2014 | Taylor et al. |
| 2014/0204285 A1 | 7/2014 | Jang |
| 2014/0238153 A1 | 8/2014 | Wood et al. |
| 2015/0250420 A1 | 9/2015 | Longinotti-Buitoni et al. |
| 2015/0346892 A1* | 12/2015 | Parham ............... G06F 3/0304 |
| | | 345/166 |
| 2015/0373831 A1 | 12/2015 | Rogers et al. |
| 2016/0003880 A1 | 1/2016 | Deschildre et al. |
| 2017/0020413 A1 | 1/2017 | Otaka et al. |
| 2017/0089782 A1 | 3/2017 | Hirt et al. |

OTHER PUBLICATIONS

The State Intellectual Property Office of the People's Republic of China, Office Action, Chinese Application No. 201680050811X, dated Jan. 8, 2019, 20 pages.

PCT International Search Report and Written Opinion, PCT Application No. PCT/US2016/048734, dated Nov. 21, 2016, 23 pages.

United States Office Action, U.S. Appl. No. 14/843,067, dated Dec. 1, 2017, 9 pages.

United States Office Action, U.S. Appl. No. 14/843,067, dated Jun. 16, 2017, 10 pages.

\* cited by examiner

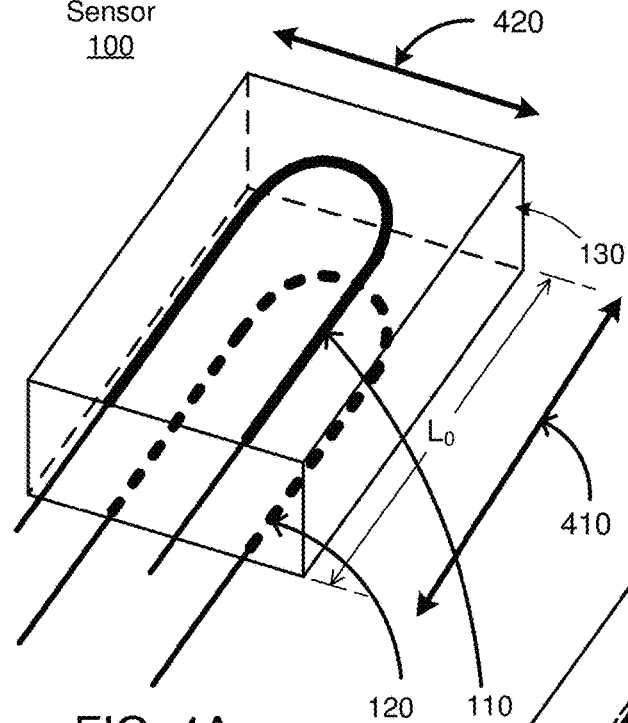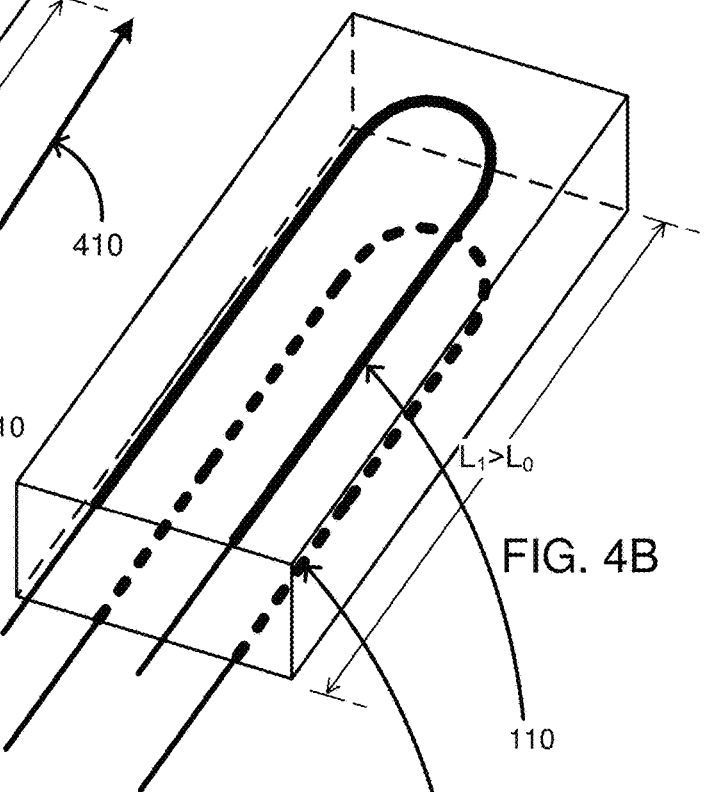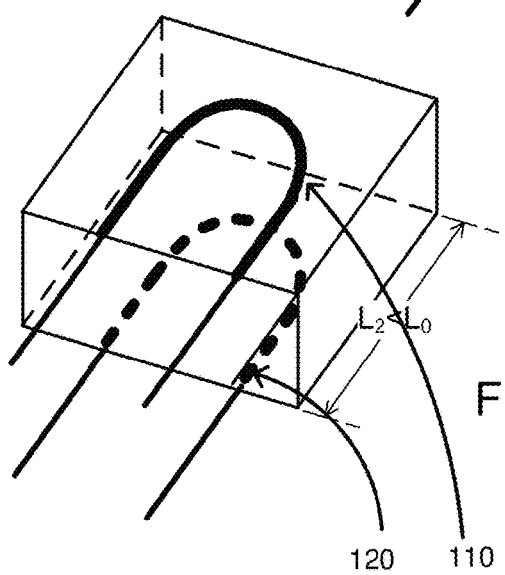

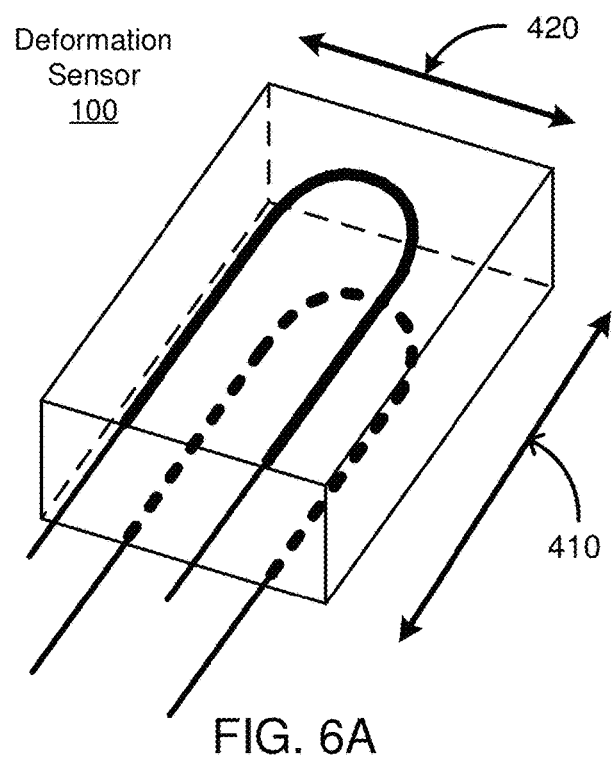
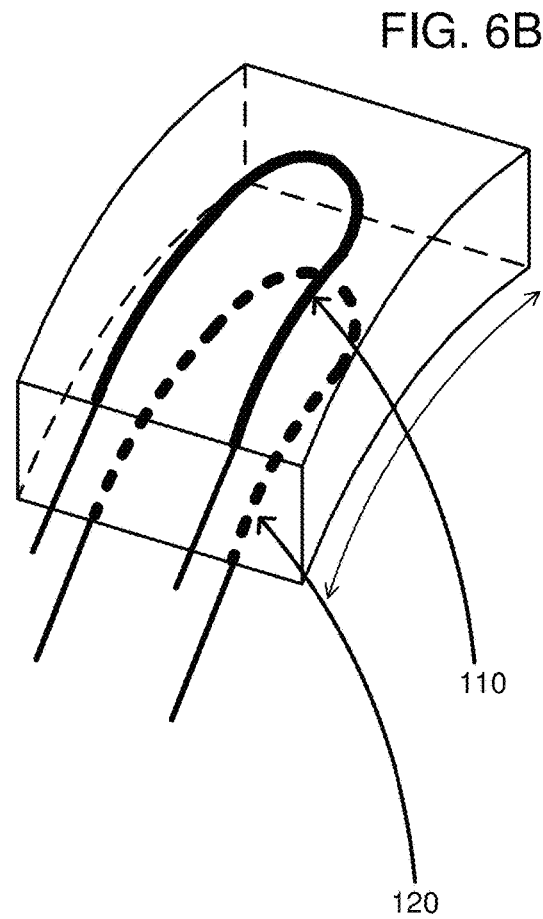
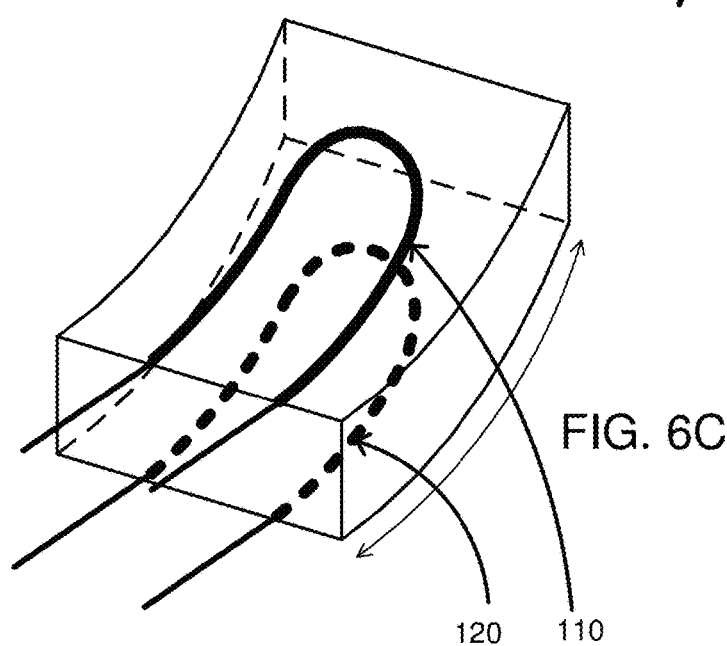

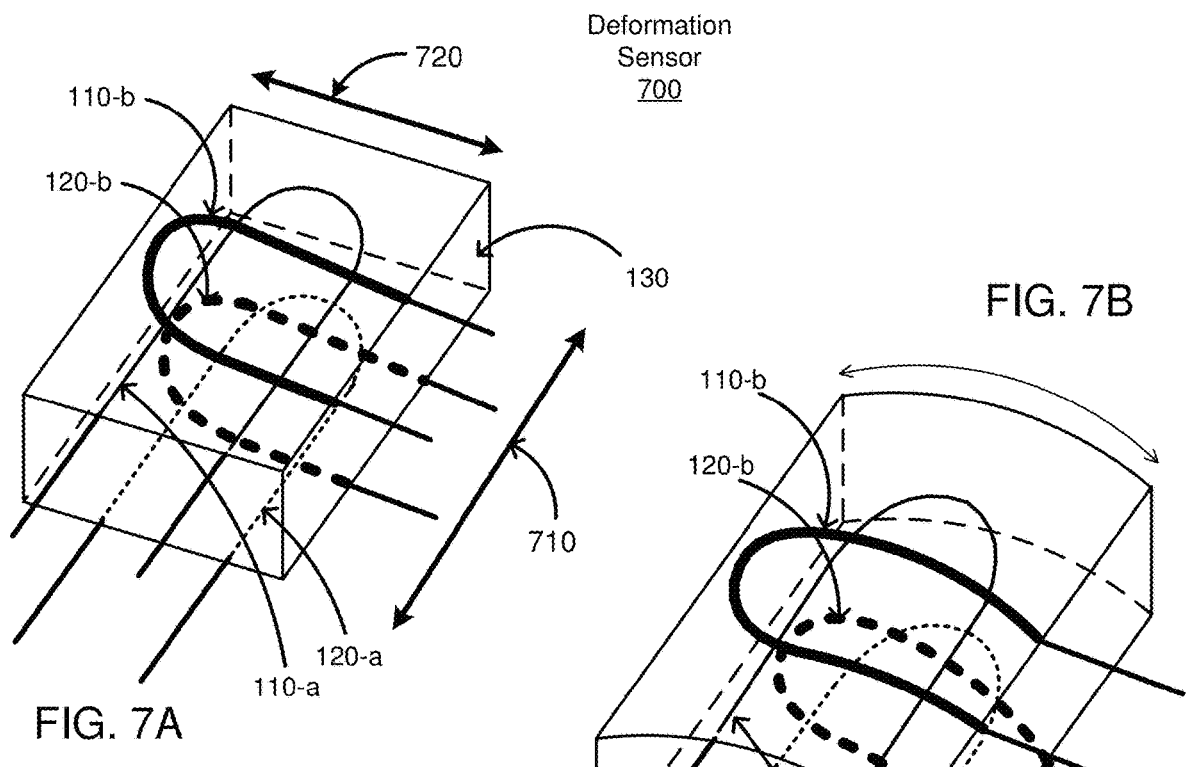
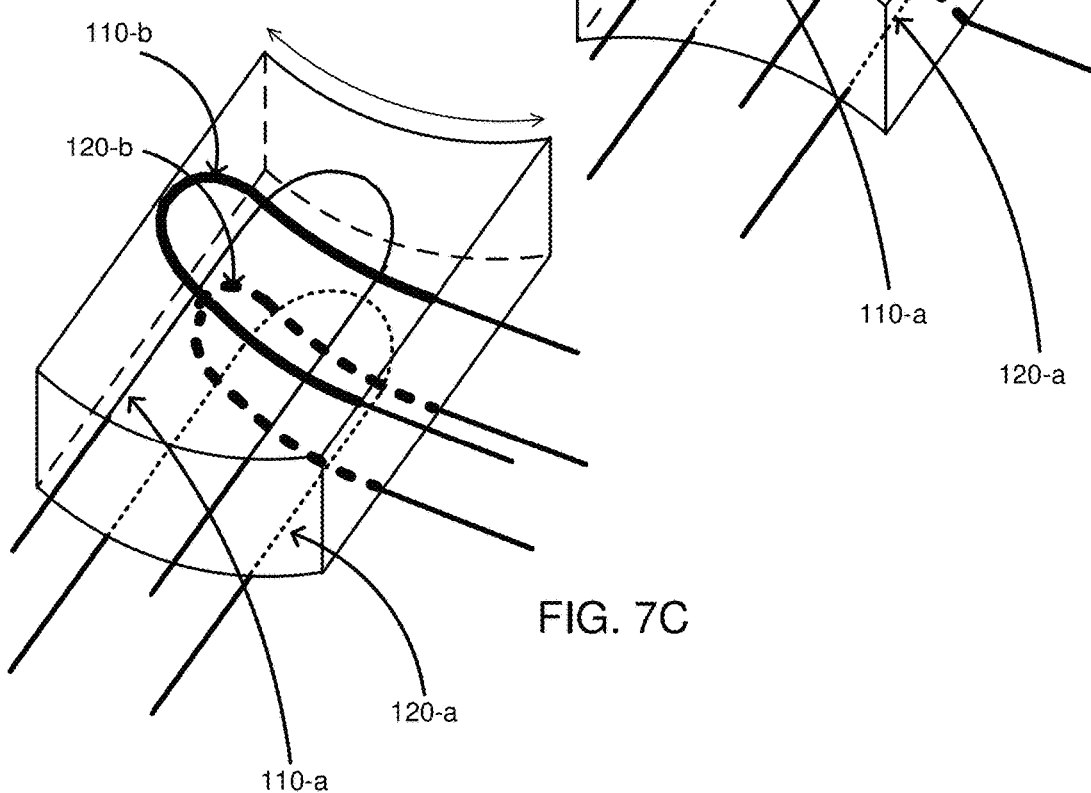

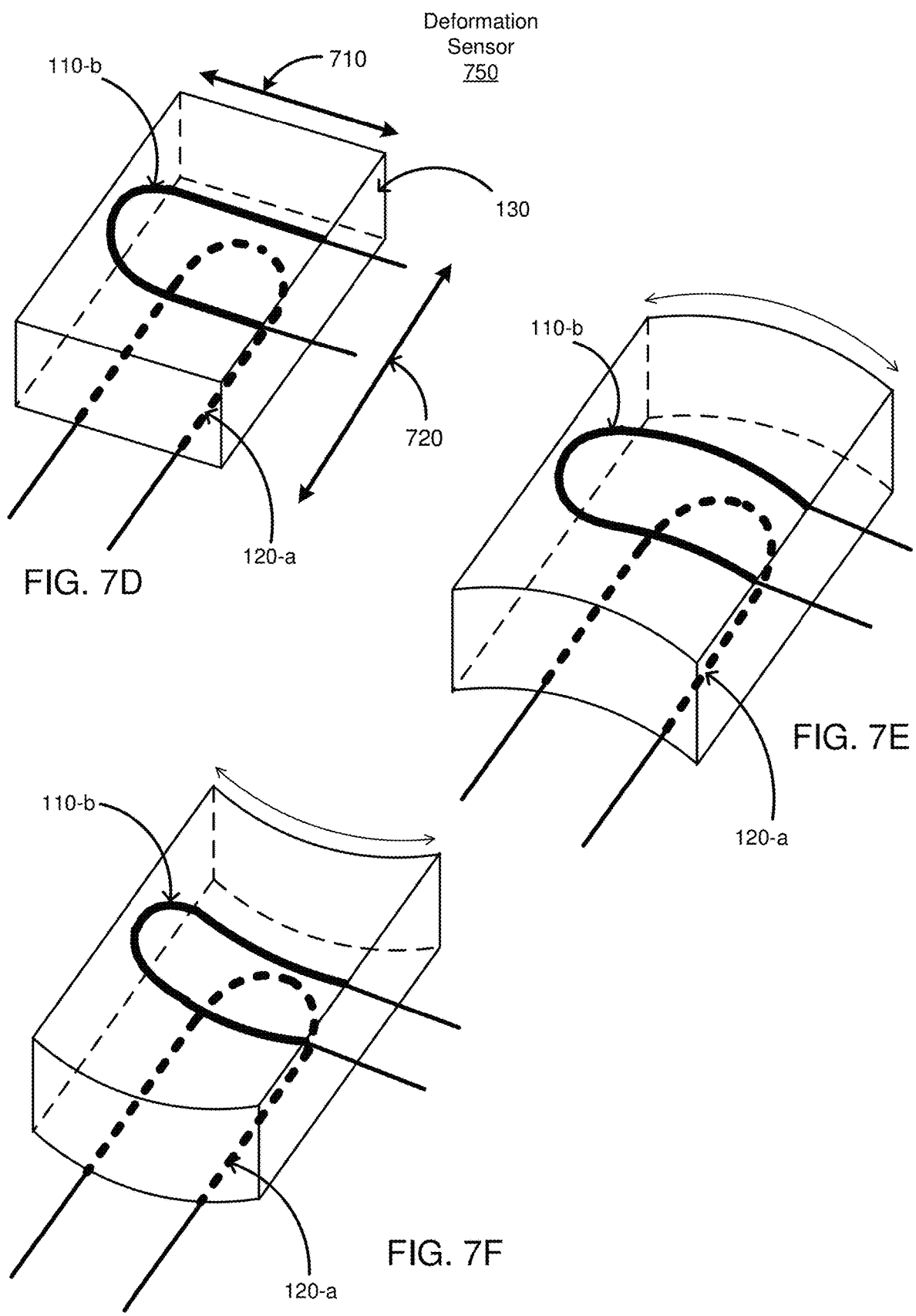

1200

Responsive to an applied deformation:

Measure a first signal from a first strain-gauge element formed on a first surface of an elastic substrate of the deformation sensor
1210

Measure a second signal from a second strain-gauge element formed on a second surface of the elastic substrate of the deformation sensor
1220

Measure a third signal between the first strain-gauge element and the second strain-gauge element
1230

Compute a measure (direction and/or magnitude) of stretch deformation and a measure (direction and/or magnitude) of flex deformation of the deformation sensor, in the applied deformation, based on the measured first signal from the first strain-gauge element, the measured second signal of the second strain-gauge element, and the third signal
1240

FIG. 12

RESISTIVE-CAPACITIVE DEFORMATION SENSOR

CROSS REFERENCE TO RELATED APPLICATIONS

This application is a continuation of U.S. application Ser. No. 14/843,067, filed Sep. 2, 2015, which is incorporated by reference in its entirety.

BACKGROUND

Strain sensors measure strain resulting from applied deformations based on a change in an electrical characteristic (e.g., a resistance, an inductance, or a capacitance) of electrical elements (such as resistive strain gauges, capacitive sensors, or inductive sensors) formed therein. However, strain sensors that measure an individual electrical characteristic (e.g., a resistance change or a capacitance change) resulting from applied deformations in isolation lack the ability to discern and differentiate different types of deformations. As one example, a resistive strain-gauge lacks the ability to disambiguate a stretching deformation from a bending deformation.

SUMMARY

A deformation sensing apparatus comprises an elastic substrate, a first strain-gauge element formed on a first surface of the elastic substrate and configured to output a first signal in response to a strain applied in a first direction, and a second strain-gauge element formed on a second surface of the elastic substrate opposite to the first surface and configured to output a second signal in response to a strain applied in the same first direction.

In one or more embodiments, the deformation sensing apparatus comprises two horseshoe-shaped (e.g., U-shaped) resistors each formed on opposing parallel sides of the elastic and dielectric substrate, forming a capacitor therebetween. Using sensed resistances from each of the two resistors in combination with the measured capacitance therebetween, the sensor provides three signals that can be used to discriminate between different types of applied deformations. For example, the combination of the three signals indicative of the two resistances and the capacitance can be used to disambiguate stretching versus bending of the substrate. The deformation sensor may be used in wearable devices such as gloves, headsets, or any other fabric that conforms to a body part and can be used to detect and disambiguate movement of that body part.

According to one or more embodiments, a wearable device comprises one or more deformation sensors, a measurement circuit, and a deformation analyzer. In such embodiments, each deformation sensor includes an elastic substrate comprising a flexible, electrically-insulating dielectric material; a first strain-gauge element formed on a first surface of the elastic substrate and configured to output a first signal in response to a strain applied in a first direction; and a second strain-gauge element formed on a second surface of the elastic substrate opposite to the first surface and configured to output a second signal in response to a strain applied in the same first direction. In some embodiments, the deformation sensor is configured to output a third signal responsive to an applied deformation, the third signal being measurable between one of the first and second terminals of the first strain-gauge element and one of the third and fourth terminals of the second strain-gauge element. The measurement circuit configured to measure the first signal from the first strain-gauge element and the second signal from the second strain-gauge element in response to the applied deformation. The deformation analyzer configured to compute a measure of stretch deformation and a measure of flex deformation of the sensing apparatus, in the applied deformation, based on the measured first signal from the first strain-gauge element, the measured second signal of the second strain-gauge element, and the third signal.

In some embodiments, each of the first and second strain-gauge elements of the deformation sensor within the wearable device has a horse-shoe shape comprising an arcuate head and a pair of elongate leads extending from ends of the arcuate head; alignment of the shapes of the first and second strain-gauge elements correspond along an axis orthogonal to the first and second surfaces of the elastic substrate. In such embodiments, the aligned shapes of the horse-shoes are configured to circumscribe (surround) an articulating joint, where a movement of the joint results in a corresponding deformation of the deformation sensor.

BRIEF DESCRIPTION OF THE DRAWINGS

FIGS. 4A-4C illustrate length-wise stretch deformations applied to a deformation sensing apparatus, according to one or more embodiments.

FIGS. 6A-6C illustrate length-wise flex deformations applied to a deformation sensing apparatus, according to one or more embodiments.

FIGS. 7A-7F illustrate modified deformation sensors including orthogonally oriented strain-gauges to disambiguate stretch and flex deformations in orthogonal directions, according to one or more embodiments.

FIG. 12 includes a flowchart illustrating a method of sensing deformation using the deformation sensing apparatuses disclosed herein, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
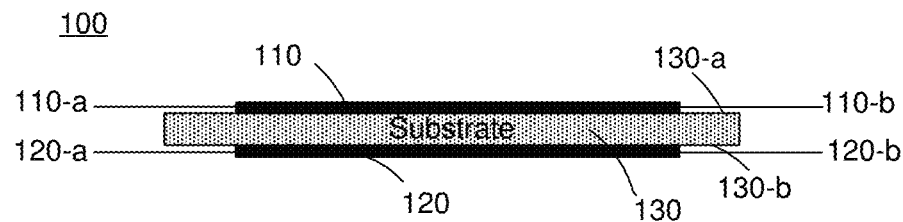
FIGS. 1A-1C illustrate each a side view of a deformation sensing apparatus with and without applied stretch deformation, in accordance with one or more embodiments.
Figure 1B:
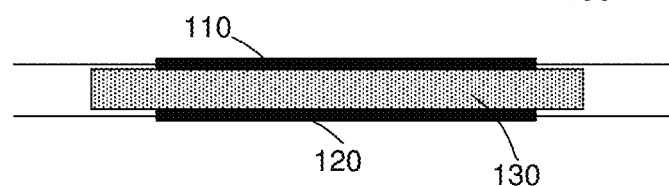
Figure 1C:
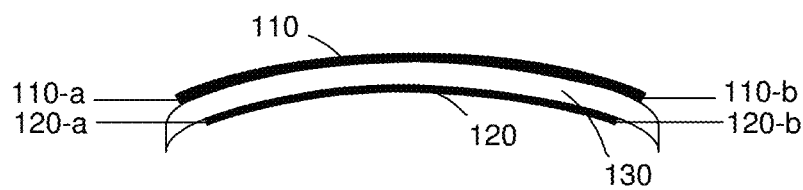

FIGS. 1A-1C illustrate each a side view of a deformation sensing apparatus with and without applied deformations, in accordance with one or more embodiments.

FIGS. 1A-1C illustrate each a side view of a deformation sensing apparatus 100 (alternatively referred to herein as a deformation sensor 100). FIG. 1A shows a side view of the deformation sensing apparatus 100 without an applied deformation, in accordance with one or more embodiments. As shown in FIG. 1A, deformation sensing apparatus 100 includes a first strain-gauge element 110, a second strain-gauge element 120, and an elastic substrate 130. The first strain-gauge element 110 is formed on a first surface 130-a of the elastic substrate 130. The second strain-gauge element is formed on a second surface 130-b of the elastic substrate 130, the second surface 130-b being opposite to the first surface 130-a.

The first strain-gauge element 110 is configured to output a first signal in response to a strain applied in a first direction. The second strain-gauge element 120 is configured to output a second signal in response to a strain applied in the same first direction. In some embodiments, the first and second strain-gauges are symmetrically formed on opposite sides of the substrate to have the same or symmetrically corresponding alignment, on the opposite sides of the elastic substrate. For example, the lengths of the first and second strain-gauges are parallel (and optionally coincide and are co-planar). As a result, the first and second strain-gauges produce like responses to a strain applied in a specific direction. Thus, when a strain is applied along a direction parallel to a length of the strain-gauges, both strain-gauges output corresponding signals responsive to the strain.

As illustrated in FIG. 1A, and in some embodiments, the first strain-gauge element 110 has two distinct terminals, a first terminal 110-a and a second terminal 110-b. The first signal output from the first strain-gauge element 110 is measurable across the first and second terminals of the first strain-gauge element. In some embodiments, the first signal is indicative of a first resistance (R1) or a first resistance change ($\Delta R1$) of the first strain-gauge element 110 measured in response to an applied deformation resulting from a deformation. The deformation may occur in response to the applied strain in the first direction and other deformations (such as a flexural or bending deformations).

In some embodiments, the second strain-gauge element 120 has two distinct terminals, a third terminal 120-a and a fourth terminal 120-b, as shown in FIG. 1A. The second signal is measurable across the third and fourth terminals of the second strain-gauge element. In some embodiments, the second signal is indicative of a second resistance (R2) or second resistance change ($\Delta R2$) of the second strain-gauge element 120 measured responsive to the applied deformation.

In some embodiments, the elastic substrate 130 comprises a flexible, electrically-insulating dielectric material. The deformation sensor 100 is configured to output a third signal responsive to the applied strain in the first direction, the third signal being measurable between a terminal of the first strain-gauge element and a terminal of the second strain-gauge element. In some embodiments, the third signal is indicative of a capacitance (C) or capacitance change ($\Delta C$) across the elastic substrate measured responsive to the applied deformation.

Illustrative materials for stretchable substrates (such as the elastic substrate 130) include Silicone (PDMS) which can be doped with conductive particles (carbon black, carbon nanotubes, silver nanoparticles or nanowires) to create conductive strain sensitive paths (strain-gauge elements). Configurations can range in hardness from less than 10 durometer through 100 durometer, tolerate stretch exceeding 200% and max bend radius as small as the total sensor thickness. The non-conductive layer (e.g., dielectric elastic substrate 130) can be a homogeneous elastomer, or it could be an elastomer foam (open cell or closed cell) which would produce a non-linear gap to dielectric permittivity relationship that could be used to optimize for improved sensitivity for specific deformation values or ranges.

FIG. 1B illustrates a length-wise stretch of the deformation sensor 100, resulting in an extension of lengths of the first and second strain-gauge elements 110 and 120 and a reduction in width (thickness) of the elastic substrate 130. As a result of the change in dimensions of the first and second strain-gauge elements 110 and 120, as well as a change in the thickness of the intervening dielectric substrate 130, the resistances R1 and R2 as well as the capacitance C, change in a known and deterministic way. The first, second, and third signals are indicative of the resistances R1, R2 and capacitance C, or changes in R1, R2, and C. In some embodiments, and as described further with reference to FIG. 3, a combination of the three signals can be used to estimate a magnitude (and optionally direction) of stretch extension of the sensor 100.

Conversely, FIG. 1C illustrates a stretch deformation resulting in a compression of the sensor 100. In some implementations, in the resting state (in the absence of any deformation), the strain gauge elements are configured to have a preexisting elongation stretch when formed in the substrate. In such implementations, the strain-gauge elements can sense a compression stretch resulting in a decrease in the preexisting elongation stretch.

Figure 2A:
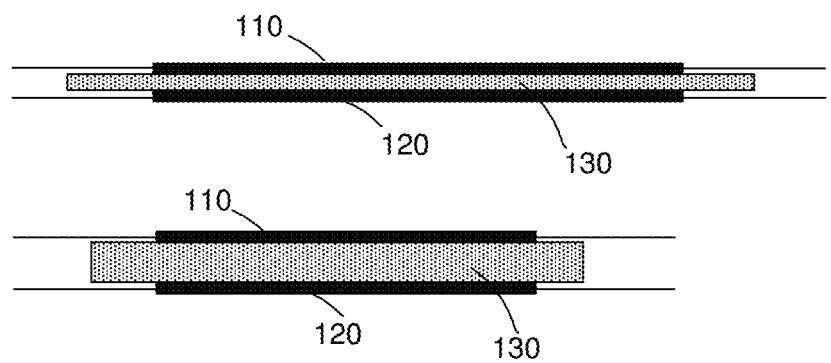
FIGS. 2A-2C illustrate each a side view, of a deformation sensing apparatus with and without applied flex deformation, in accordance with one or more embodiments.
Figure 2B:
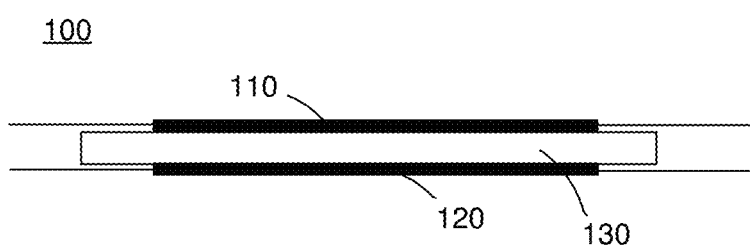
Figure 2C:
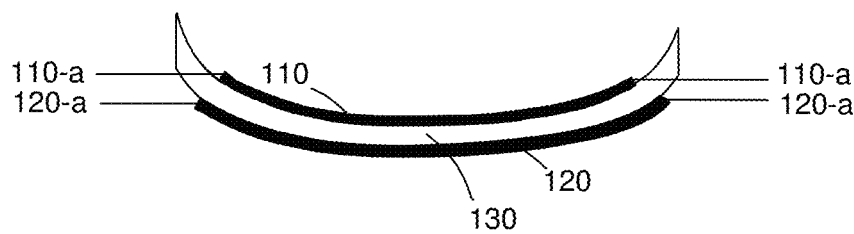

FIGS. 2A-2C illustrate each a side view, of a deformation sensing apparatus with and without applied flex deformation, in accordance with one or more embodiments. FIG. 2A illustrates the deformation sensor 100 in the absence of any deformation. FIGS. 2B-2C illustrate a flexion (flex deformation) of the deformation sensor 100, resulting in an arcing or bending of the surfaces of the elastic substrate 130. An asymmetric change occurs in dimensions of the first and second strain-gauge elements 110 and 120—e.g., length of first element 110 increases in FIG. 2B more so than the length of element 120 when the bend is toward the second element 120; length of element 120 increases in FIG. 2C more so than the length of element 110 when the bend is toward the first element 110. As a result, the resistances R1 and R2 vary asymmetrically under the applied flex deformations, in a deterministic manner. Additionally, a change in the thickness and orientation of the intervening dielectric substrate 130, results in a change in the capacitance C, in a known and deterministic manner. The first, second, and third signals are indicative of the resistances R1, R2 and the capacitance C, or changes in R1, R2, and C. In some embodiments, and as described further with reference to FIG. 3, a combination of the three signals can be used to estimate a magnitude (and optionally direction) of flex extension of the sensor 100.

Figure 3A:
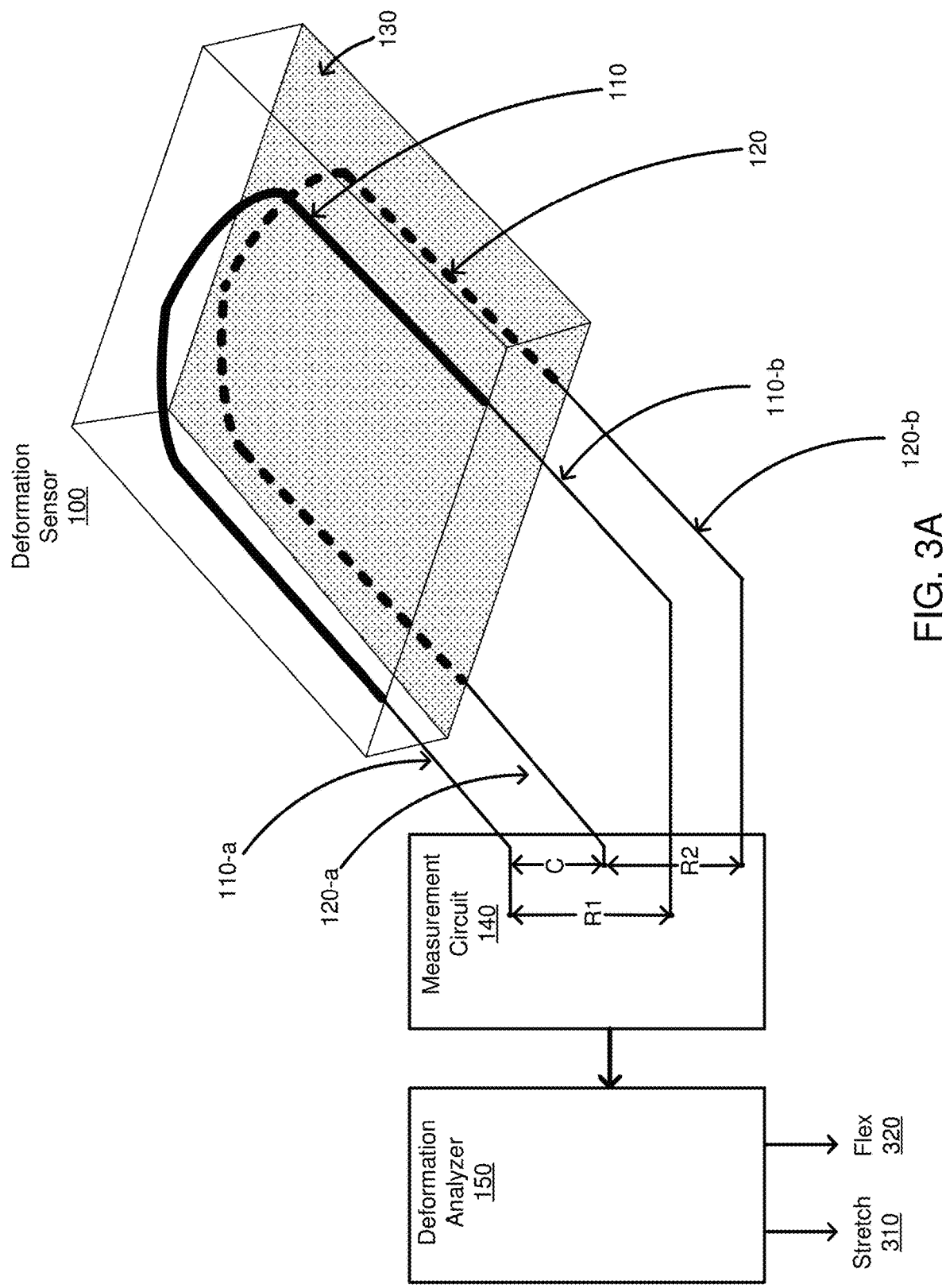
FIG. 3A illustrates a deformation sensing system including a perspective view of a deformation sensing apparatus, according to one or more embodiments.

FIG. 3A illustrates a deformation sensing system 300 including a deformation sensing apparatus 100, according to one or more embodiments. In one or more embodiments, the deformation sensing system comprises a deformation sensor 100, a measurement circuit 140, and a deformation analyzer 150.

As explained with reference to FIG. 1A, the deformation sensor 100 includes the first and second strain-gauge elements 110 and 120 and the elastic substrate 130, as explained with reference to FIG. 1A. In some embodiments, and in the illustration of FIG. 3A, each of the first and second strain-gauge elements 110 and 120 has a horse-shoe ('U')

shape, comprising an arcuate (e.g., curved or semi-circular) head and a pair of elongate leads extending from ends of the arcuate head. An advantage of the horse-shoe ('U') shape is that the 'U' shape is a geometrically simple way of extending a simple rectangular plate of a parallel plate capacitor into a resistive current path with a measurable resistance across its terminals (by passing a current through or applying a voltage from end-to-end). This geometric simplicity is advantageous from a design and manufacturing standpoint. Measurement of the resistance R1 and R2 by interrogating a conductive element (e.g., a rectangle or single-dimensional wire-like trace) across both ends would result in similar mathematical formulations, but single-ended or single-sided measurements are more useful from a packaging standpoint. A multi-pass meandering path (e.g., multiple U-shapes) could alternatively be used. These chosen geometries would impact the total resistance of each strain-gauge element as well as the model for capacitance between the two strain-gauge elements.

In some embodiments, alignment of the shapes of the first and second strain-gauge elements correspond (e.g., overlap or coincide) along an axis orthogonal to the first and second surfaces of the elastic substrate 130. In such embodiments, central axes of the first and second strain-gauge elements 110 and 120 are aligned parallel, also correspond (e.g., overlap or coincide) and are formed within a same plane that is orthogonal to the first and second surfaces of the elastic substrate. In other words, the horse-shoes are aligned along parallel and coinciding central axes. Similarly, corresponding leads of the pairs of elongate leads of the first and second strain-gauge elements are respectively parallel and have substantially the same dimensions.

In some embodiments, the measurement circuit 140 is configured to measure the first signal from the first strain-gauge element 110 and the second signal from the second strain-gauge element 120 in response to an applied deformation.

As explained with reference to FIG. 1A, in some embodiments, the first signal is indicative of a first resistance (R1) or a first resistance change ($\Delta R1$) of the first strain-gauge element 110 measured responsive to an applied deformation (e.g., that includes the strain in the first direction). In some embodiments, the first signal is measured responsive to a first known electrical signal (e.g., known voltage or current) applied by the measurement circuit between the first and second terminals 110-$a$ and 110-$b$ of the first strain-gauge element 110.

In some embodiments, and as explained with reference to FIG. 1A, the second signal is indicative of a second resistance (R2) or second resistance change ($\Delta R2$) of the second strain-gauge element 120 measured responsive to the applied deformation. In some embodiments, the second signal is measured responsive to a second known electrical signal (e.g., known voltage or current) applied by the measurement circuit between the third and fourth terminals 120-$a$ and 120-$b$ of the second strain-gauge element 120.

In some embodiments, the third signal is indicative of a capacitance (C) or capacitance change ($\Delta C$) across the elastic substrate measured responsive to the applied deformation. In some embodiments, the third signal is measured responsive to a third known electrical signal (e.g., a known alternating current) applied between a terminal (e.g., one of the first and second terminals) of the first strain-gauge element 110 and a terminal (e.g., one of the third and fourth terminals) of the second strain-gauge element 120.

In some embodiments, the measurement circuit 140 has two alternating (time-interleaved) measurement phases. During a first phase, for measurement of R1 and R2, a known voltage or current may be provided across each of the first and second strain-gauge elements. During a second phase, for measurement of C, the first and second terminals 110-$a$ and 110-$b$ of the first strain-gauge element may be shorted to form one plate of a capacitor and similarly, the third and fourth terminals 120-$a$ and 120-$b$ of the second strain-gauge element 120 may be shorted to form a second plate of the capacitor; the elastic substrate forming the dielectric insulator between the first and second plates. The capacitance C is then optionally measured across the first plate (the first and second terminals 110-$a$ and 110-$b$, shorted together) and the second plate (the third and fourth terminals 120-$a$ and 120-$b$, shorted together).

Figure 3B:
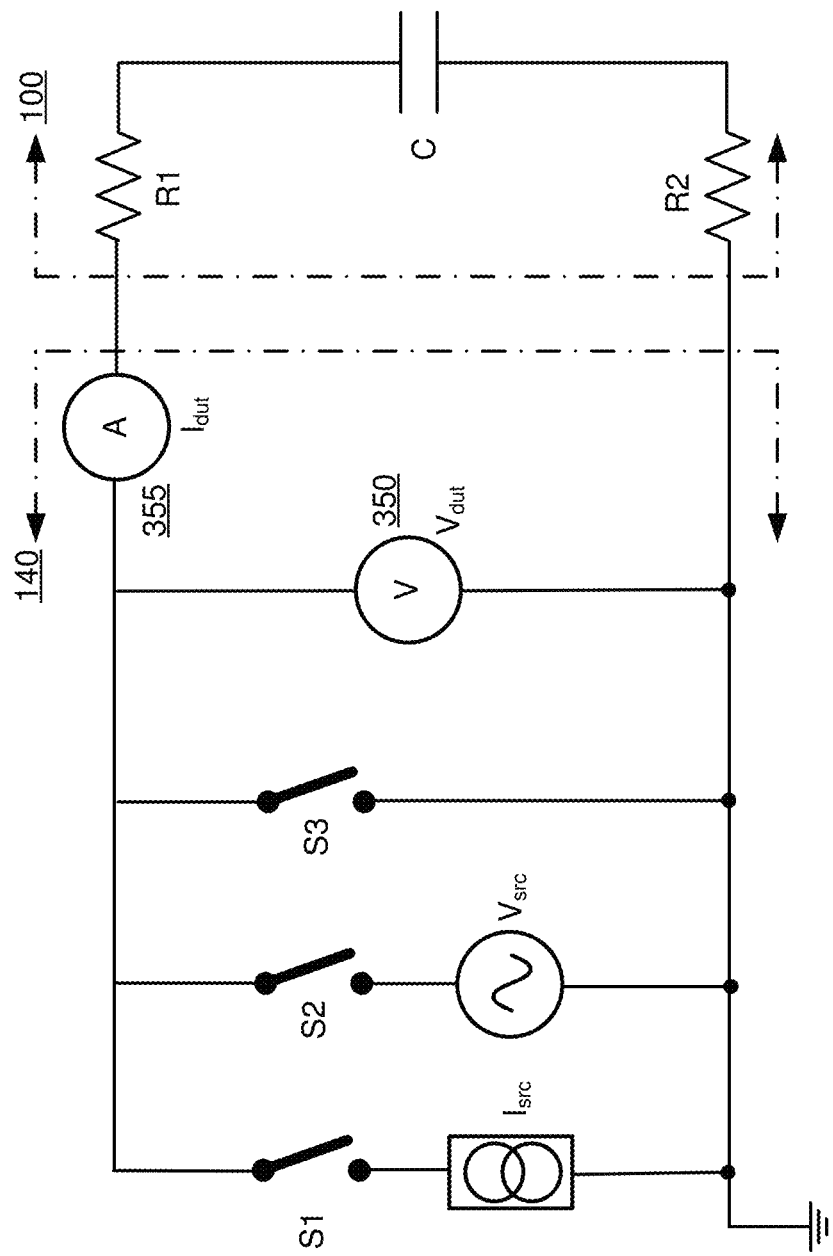
FIG. 3B includes an illustrative implementation of the measurement circuit of FIG. 3A, according to some embodiments.

FIG. 3B includes an illustrative implementation of the measurement circuit 140 of FIG. 3A, according to some embodiments. The measurement circuit 140 includes switches S1, S2, and S3; a current source $I_{src}$, a voltage source $V_{src}$, a voltmeter 350, and an ammeter 355.

According to one or more embodiments, the resistive component (R1+R2) is measured using the apparatus of FIG. 3B based on one or more of the approaches listed below:

Measurement of Bulk R[R1+R2]:

1) Discharge apparatus 325. Set the current source ($I_{src}$) to constant dc current and switch S1 on. Measure the initial dc voltage ($V_{dut}$) at the measurement point, which is $I_{dut}*(R1+R2)$. Combined resistance (R1+R2) can be determined based on the measured values of $V_{dut}$ and $I_{dut}$.

2) Discharge apparatus 325. Set the voltage source ($V_{src}$) to constant dc voltage and switch S2 on. Measure the initial dc current ($I_{dut}$) at the measurement point, which is $V_{dut}/(R1+R2)$. Combined resistance (R1+R2) can be determined based on the measured values of $V_{dut}$ and $I_{dut}$.

3) Discharge apparatus 325. Introduce a charge to the source and switch on. Measure the initial voltage ($V_{dut}$) and current ($I_{dut}$) at the source, and note $R1+R2=V_{dut}/I_{dut}$.

4) Drive the current source ($I_{src}$) with constant AC current, or the voltage source ($V_{src}$) with a constant AC voltage, at a frequency known to be significantly higher than the $1/(2*pi*(R1+R2)*C)$ frequency of the system. Note the steady state RMS voltage ($V_{dut}$) and current ($I_{dut}$) at the measurement point and compute $R1+R2=V_{dut}/I_{dut}$.

Furthermore, according to one or more embodiments, the capacitive component (C) is measured using the apparatus of FIG. 3B based on one or more of the approaches listed below.

Measurement of Capacitance (C):

1) Set the voltage source ($V_{src}$) to constant dc voltage and switch S2 on. Measure time for C to charge, for example, based on a time to charge to a predefined measure of current ($I_{dut}$) measured with reference to turning on of switch S2. Compare with a discharge time interval for a known reference capacitor for the same predefined current value, and for the same value of bulk resistance (R1+R2). The capacitance variation is inversely proportional to time. Then, turn off switch S2 and turn on switch S3 to discharge the capacitor (C) and repeat the current-time measurements and record analogous current-time measurements to compute a value of C from its discharge characteristics compared to those of a reference capacitor.

2) AC Impedance: Set the voltage source ($V_{src}$) to a constant AC voltage at a frequency on the same order of magnitude as the resonant frequency, $1/(2*\pi*(R1+R2)*C)$, of the system and turn on S2. Measure the RMS current ($I_{dut}$) into the system and compare to a charging current for a reference capacitance at the same R1+R2 bulk resistance. Note the current ($I_{dut}$) which is directly proportional to the capacitance C.

3) Discharge apparatus 325. Charge Transfer: Use a constant charge or a constant current for a fixed duration of time as the stimulus. Note the open circuit voltage, $V_{dut}$, after the system has settled, and that this is inversely proportional to the capacitance for a constant charge or constant duration current pulse.

4) Resonance: Replace the ammeter 355 (A) with an inductor with known inductance (say of value L). Drive the voltage source ($V_{src}$) with a constant AC voltage and sweep frequency of the AC voltage to search for resonance minima or maxima of the LC system. The resonance frequency is 1/(1*pi*sqrt(L*C)). Determine C based on the measured resonant frequency and known inductance value L.

In some embodiments, the deformation analyzer 150 computes a measure (e.g., an absolute metric or a fractional proportion) of stretch deformation 310 and a measure (e.g., an absolute metric or a fractional proportion) of flex deformation 320 of the sensing apparatus 100, in the applied deformation, based on the measured first signal from the first strain-gauge element 110, the measured second signal of the second strain-gauge element 120, and the third signal 130.

In some embodiments, stretch deformation 310 is determined as a strain on the strain-gauge element(s), computed as a change in length as a proportion of the original undeformed length [i.e., ($\Delta L_1 + \Delta L_2$)/$2L_0$; where $\Delta L_1$ and $\Delta L_2$ are changes in the lengths of the first and second strain-gauge elements and $L_0$ is the original length, respectively or if $\Delta L_1 = \Delta L_2 = \Delta L$, then as ($\Delta L$)/$L_0$], expressed as a fraction or as a percentage. For example, a strain-gauge of an undeformed length of 10 cm stretched to 15 cm has undergone a strain of 50%. In some embodiments, the measure of stretch deformation 310 is indicative of an average change in lengths of the first and second strain gauge elements 110 and 120. In such embodiments, the deformation analyzer computes the measure of stretch deformation, based on the first, second, and third signals, using the formulas:

$$R_1 = R_0 + \Delta R_1 = R_0 + (GF \cdot \Delta L_1) \quad (1)$$

$$R_2 = R_0 + \Delta R_2 = R_0 + (GF \cdot \Delta L_2) \quad (2)$$

$$C = \varepsilon \frac{\text{Area}}{\text{gap}} = \varepsilon \frac{L_0 \cdot W_0}{g} = \varepsilon \frac{L_0 \cdot W_0}{(g_0 - \Delta L \cdot \gamma)} = \varepsilon \frac{L_0 \cdot W_0}{\left(g_0 - \left(\frac{\Delta L_1 + \Delta L_2}{2}\right)\right)} \quad (3)$$

where R1 is the first resistance, R2 is the second resistance, and C is the capacitance; and
Area is an overlap between first and second strain-gauge elements,
GF is a Gauge Factor relating strain and resistance,
γ is a Poisson's Ratio of the elastic substrate relating deformations between axes,
$L_0$ is an undeformed length of the first and second strain-gauge elements,
$\Delta L$, $\Delta L_1$, $\Delta L_2$ are length changes of the first and second strain-gauge elements,
$W_0$ is an undeformed length of the first and second strain-gauge elements,
ε is a dielectric constant of the elastic substrate,
$R_0$ is a baseline resistance of the first and second strain-gauge elements, and g, $g_0$ are, respectively, deformed and baseline widths of the elastic substrate.
Alternatively, if $\Delta L_1 = \Delta L_2 = \Delta L$, then:

$$R_1 = R_2 = R_0 + (GF \cdot \Delta L) \quad (4)$$

$$C_{stretch} = \varepsilon \frac{L_0 \cdot W_0}{g} = \varepsilon \frac{L_0 W_0}{g_0 - \left(\frac{LL_1 - \Delta L_2}{2}\right) \gamma} = \varepsilon \frac{L_0 \cdot W_0}{g_0 - \Delta L \cdot \gamma} \quad (5)$$

In some embodiments, the measure of pure flex deformation is indicative of an angular bend of the surfaces of the elastic substrate on which the first and second strain-gauge elements are formed. As one example, the measure of pure flex corresponds to a radius subtended by (e.g., average radius of curvature or bend radius for) the arcs formed due to bending of the surfaces on which the conductors are formed. The deformation analyzer computes the measure of pure flex deformation, based on the first, second, and third signals, using the formulas:

$$C_{bend} = C_0 \text{ because } g = g_0 \quad (6)$$

$$R_1 = R_0 + (GF \cdot \Delta L_1) \approx R_0 + \left(\frac{g}{2\rho_1} \cdot GF\right) \quad (7)$$

$$R_2 = R_0 + (GF \cdot \Delta L_2) \approx R_0 + \left(\frac{-g}{2\rho_2} \cdot GF\right) \quad (8)$$

where R1 is the first resistance, R2 is the second resistance, and $C_{bend}$ is the capacitance; and
GF is a Gauge Factor relating strain and resistance of the first and second strain-gauge elements,
γ is a Poisson's Ratio of the elastic substrate relating deformations between axes,
$L_0$ is an undeformed length of the first and second strain-gauge elements,
$\Delta L_1$, $\Delta L_2$ are length changes of the first and second strain-gauge elements,
$R_0$ is a baseline resistance of the first and second strain-gauge elements,
g, is a deformed width of the elastic substrate, and
$\rho_1$ and $\rho_2$ are bend radii of the first and second surfaces of the elastic substrate.

For a case where stretch and flex deformations are combined (both present), and for a configuration where $C_{measured} \neq C_0$, the measures of stretch and flex deformation are computed based on calculating a common $\Delta L_{stretch}$ for both electrodes (using equation 4 and 5); subtracting from $R_{1_{measured}}$ and $R_{2_{measured}}$; and then calculating bend radii $\rho_1$ and $\rho_2$ (equations 7 and 8). For a combined stretched and bent configuration, a superposition of the two effects (stretch and flex) is considered. The total stretch is estimated based on the capacitance (or by proxy, the gap corresponding to the deformed width of the substrate (g)) of the elastic substrate. A new baseline length of the strain-gauge elements ($L_o'$) is computed (e.g., using equations 4 and 5). A new baseline measure of $R_1'$ and $R_2'$ are determined. The curvature (measure of flex) is computed based on a differences $L_1 - L_o'$ and $L_2 - L_o'$ (alternately represented by $R_1 - R_1'$ and $R_2 - R_2'$), for example, using the same method (e.g., equations 4 and 5) as described for pure curvature (flex).

FIGS. 4A-4C illustrate length-wise stretch deformations (along direction/dimension 410) applied to a deformation sensing apparatus, according to one or more embodiments.

Figure 5A:
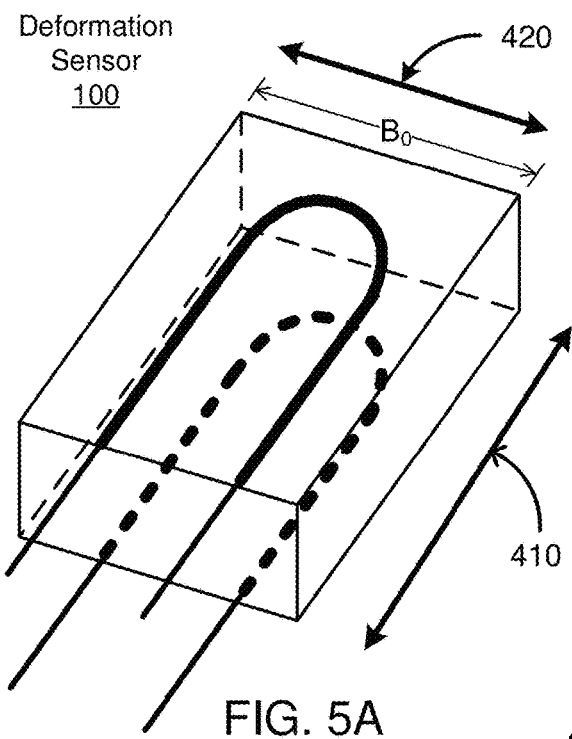
FIGS. 5A-5C illustrate breadth-wise stretch deformations applied to a deformation sensing apparatus, according to one or more embodiments.
Figure 5B:
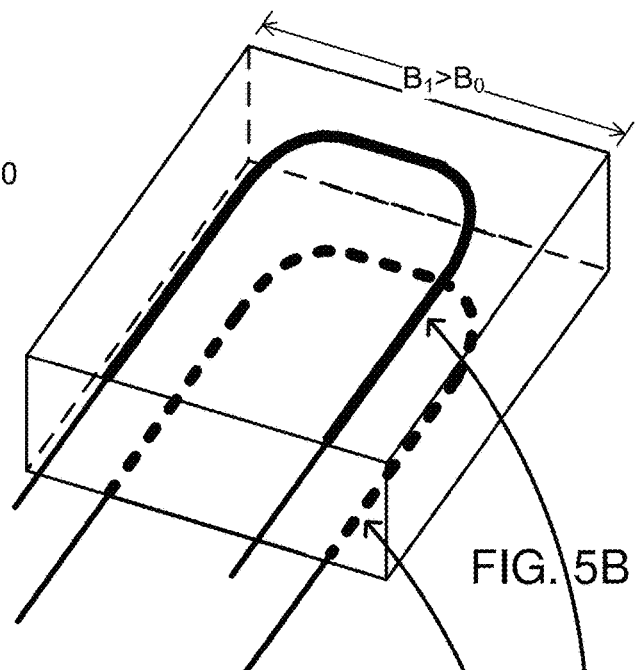
Figure 5C:
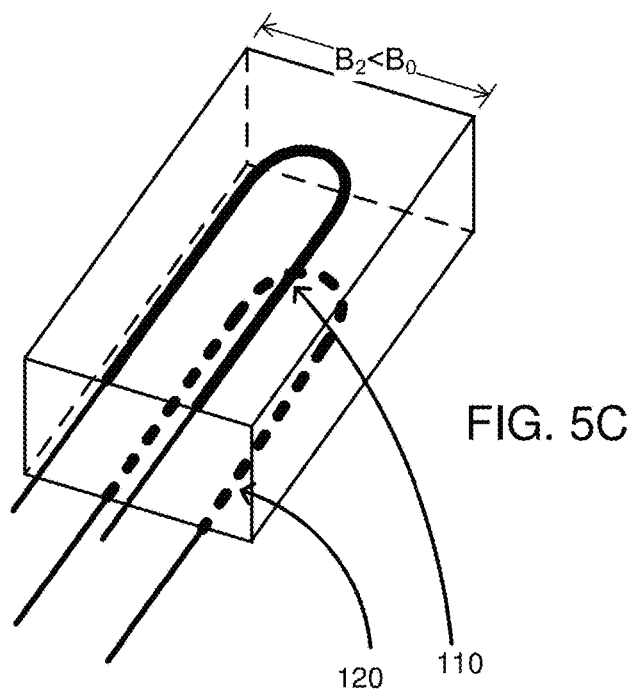

FIGS. 5A-5C illustrate breadth-wise stress deformations (along direction/dimension 420) applied to a deformation sensing apparatus, according to one or more embodiments.

FIG. 4A illustrates the deformation sensor 100 in the absence of any deformation. FIG. 4B illustrates an increase in length (and extension or elongation) of the deformation sensor 100 due to an applied stretch deformation. FIG. 4C conversely illustrates a decrease in length (a compression) of the deformation sensor 100 due to an applied stretch deformation.

FIG. 5A illustrates the deformation sensor 100 in the absence of any deformation. FIG. 5B illustrates an increase in breadth (and extension or elongation) of the deformation sensor 100 due to an applied stretch deformation. FIG. 5C conversely illustrates a decrease in breadth (a compression) of the deformation sensor 100 due to an applied stretch deformation. In some embodiments, the deformation sensor 100 is less sensitive to deformation along the breadth-wise direction illustrated in FIGS. 5A-5C than along the length-wise direction illustrated in FIGS. 4A-4C. In some embodiments, to sense and disambiguate stretch along both the length-wise and breadth-wise directions, and as explained further with reference to FIGS. 7A-7C, the deformation sensor optionally includes two pairs of strain-gauge elements, the two pairs aligned orthogonal to each other. For example, as shown in FIG. 7A, the primary strain-gauge pair 110-a and 120-a is perpendicular to the secondary pair 110-b and 120-b. In such embodiments, the deformation analyzer (explained with reference to FIG. 3A) determines a direction of the stretch deformation (e.g., along the length of the primary pair of leads 110-a and 120-a as shown in FIGS. 7A-7C), or along the lengths of the secondary pair of leads 110-b and 120-b as shown in FIGS. 7A-7C) based on the measured first, second, and third signals. Thus, when coupled to this orthogonal U-pair configuration, the deformation analyzer would additionally disambiguate bend directions. The first strain-gauge pair (110-a and 120-a) would respond (via change in their respective resistances) to a deformation in a first bend (or stretch) direction along their respective lengths, whereas the second pair (110-b and 120-b) would be relatively unresponsive in this first bend (or stretch) direction. Conversely, the second strain-gauge pair (110-b and 120-b) would respond (via change in their respective resistances) to deformation in a second bend (or stretch) direction along their respective lengths, whereas the first pair (110-b and 120-b) would be unresponsive in this second bend (or stretch) direction.

Returning to the configurations of FIGS. 4A-4C and 5A-5C, in some embodiments, the deformation analyzer computes a magnitude of the stretch deformation based on the measured first, second, and third signals. For example, the deformation analyzer may compute an average length change of the leads of the first or second strain-gauge elements, or a change in a distance between the leads of a given lead pair of the first or second gauge, based on the values of R1, R2, and C obtained from the first, second, and third signals.

For example, for a length-wise stretch (e.g., FIG. 4B), a magnitude of stretch is computed using the equations 1-5.

On the other hand, for a breadth-wise stretch (e.g., FIG. 5B), the deformation analyzer is configured to compute the magnitude of stretch using the equations 3 and 5 (change in capacitance), since a change in resistances R1 and R2 would be negligible for a breadth-wise stretch.

Furthermore, the deformation analyzer may determine whether the stretch deformation corresponds to a compression stretch or an elongation stretch by comparing the measured first, second, and third signals. For example, a compression (e.g., FIG. 4C) would decrease lengths of the first and second strain-gauge elements 110 and 120 and increase the gap between the first and second strain-gauge elements 110 and 120, thus causing a change in resistances (R1 and R2) and a change in capacitance (C).

FIGS. 6A-6C illustrate length-wise flex deformations (along direction/dimension 410) applied to a deformation sensing apparatus, according to one or more embodiments.

FIG. 6A illustrates the deformation sensor 100 in the absence of any deformations. FIG. 6B illustrates a length-wise flex deformation (bending along the length of the leads) of the deformation sensor 100 due to an applied flex deformation, the bending being toward the second element 120. FIG. 6C conversely illustrates a length-wise flex deformation (bending along the length of the leads) of the deformation sensor 100 due to an applied flex deformation, the bending being toward the first element 110.

FIGS. 7A-7C illustrate a first modified deformation sensor 700 including orthogonal strain-gauge pairs to detect and disambiguate stretch or flex deformations along two orthogonal directions 710 and 720 (e.g., length-wise versus breadth-wise deformations, respectively), according to one or more embodiments. For instance, the deformation sensor 700 includes two pairs of strain-gauge elements (the primary strain-gauge pair 110-a and 120-a; and the secondary pair 110-b and 120-b), the two pairs aligned orthogonal to each other and configured to generate respective signals in response to stretch and flex deformations along orthogonal directions (710 and 720, respectively).

FIG. 7A illustrates the deformation sensor 700 in the absence of any deformations. FIG. 7B illustrates a breadth-wise flex deformation (bending along direction/dimension 720 orthogonal to the length of the primary leads 110-a and 120-a, but along the lengths of the secondary leads 110-b and 120-b) of the deformation sensor 700 due to an applied flex deformation, the bending being toward the second element 120-b. FIG. 7C conversely illustrates a breadth-wise flex deformation (bending along direction/dimension 720 orthogonal to the length of the primary leads 110-a and 120-a, but along the lengths of the secondary leads 110-b and 120-b) of the deformation sensor 700 due to an applied flex deformation, the bending being toward the first element 110-b.

In some embodiments, when the deformation sensor includes orthogonal strain-gauge pairs (such as those illustrated in FIGS. 7A-7C), the deformation analyzer (e.g., explained with reference to FIG. 3) determines a direction of the flex deformation (e.g., whether the flex is along the length of the leads as shown in FIGS. 6A-6C, or perpendicular to the lengths of the primary leads and along the lengths of the secondary leads, as shown in FIGS. 7A-7C) based on the measured first, second, and third signals independently obtained from each of the lead pairs.

Additionally, in some embodiments, the deformation analyzer (e.g., explained with reference to FIG. 3) computes a magnitude of the flex deformation based on the first, second, and third signals (indicative of R1, R2, and C) independently obtained from each of the lead pairs. In some cases, the magnitude of flex corresponds to an average radius of curvature subtended by arcs formed by the bent surfaces of the elastic substrate that undergo bending due to the applied deformation. Alternatively, the magnitude of flex corresponds to an average angle subtended by arcs formed by the bent surfaces of the elastic substrate that undergo bending due to the applied deformation.

Stated differently, in some embodiments, a deformation sensing apparatus (e.g., first modified deformation sensor 700) comprises an elastic substrate 130, a first strain-gauge pair (e.g., primary pair of strain-gauges 110-*a* and 120-*a*), and a second strain-gauge pair (e.g., secondary pair of strain-gauges 110-*b* and 120-*b*).

The first strain-gauge pair comprises a first strain-gauge element 110-*a* formed on a first surface of the elastic substrate 130, and configured to output a first signal (indicative of a resistance of the first strain-gauge element 110-*a*) in response to a strain applied in a first direction 710; and a second strain-gauge element 120-*a* formed on a second surface of the elastic substrate 130 opposite to the first surface, and configured to output a second signal (indicative of a resistance of the second strain-gauge element 120-*a*) in response to a strain applied in the same first direction 710. The deformation sensing apparatus 750 is further configured to output a third signal (indicative of a capacitance of the elastic substrate 130 measured between the first and second strain-gauge elements 110-*a* and 120-*a*) responsive to an applied deformation, the third signal being measurable between a terminal of the first strain-gauge element 110-*a* and a terminal of the second strain-gauge element 120-*a*.

The second strain-gauge pair comprises a third strain-gauge element 110-*b* formed substantially on the first surface of the elastic substrate 130, and configured to output a fourth signal (indicative of a resistance of the third strain-gauge element 110-*b*) in response to a strain applied in a second direction 720; and fourth strain-gauge element 120-*b* formed substantially on the second surface of the elastic substrate 130 opposite to the first surface, and configured to output a fifth signal (indicative of a resistance of the fourth strain-gauge element 120-*b*) in response to a strain applied in the same second direction 720. The deformation sensing apparatus 750 is configured to output a sixth signal (indicative of a capacitance of the elastic substrate 130 measured between the third and fourth strain-gauge elements 110-*b* and 120-*b*) responsive to an applied deformation, the sixth signal being measurable between a terminal of the third strain-gauge element 110-*b* and a terminal of the fourth strain-gauge element 120-*b*.

In some embodiments, the first direction 710 is orthogonal to the second direction 720; the strain-gauge elements 110-*a* and 120-*a* of the first strain-gauge pair, and the strain-gauge elements 110-*b* and 120-*b* of the second strain-gauge pair are mutually orthogonal.

In such embodiments, the deformation analyzer is further configured to determine a direction of stretch deformation as being either a stretch in the first direction 710 or in the second direction 720 by comparing magnitudes of the first, second, fourth, and fifth signals detected from the first and second strain-gauge pairs. For a stretch in the first direction 710, the deformation analyzer is configured to compute a magnitude of stretch using the first and second signals; and for a stretch in the second direction 720, the deformation analyzer is configured to compute the magnitude of stretch using the fourth and fifth signals.

Additionally, in such embodiments, the deformation analyzer is further configured to determine a direction of flex deformation as being either a bend in the first direction 710 or in the second direction 720 by comparing magnitudes of the first, second, fourth, and fifth signals detected from the first and second strain-gauge pairs. For a bend in the first direction 710, the deformation analyzer is configured to compute a magnitude of bend using the first and second signals; and for a bend in the second direction 720, the deformation analyzer is configured to compute a magnitude of bend using the fourth and fifth signals.

In such embodiments, for a length-wise bending arc (along lengths of the primary pair 110-*a* and 120-*a*), the magnitude of flex is computed using the equations 6-8 as applied to the first, second, and third signals obtained from the primary pair of strain-gauges 110-*a* and 120-*a*.

Conversely, for a breadth-wise bending arc (along lengths of the secondary pair 110-*b* and 120-*b*, as illustrated in FIGS. 7B-7C), the magnitude of flex is computed using the equations 6-8 as applied to the fourth, fifth, and sixth signals obtained from the secondary pair of strain-gauges 110-*b* and 120-*b*.

Additionally, the deformation analyzer is further configured to determine, by comparing the measured first, second, and third signals from the appropriate pair of strain-gauges (110-*b* and 120-*b*, in the case of FIGS. 7A-7C), whether the flex deformation corresponds to a bend toward the first surface of the elastic substrate (toward 110-*b*) or a bend toward the second surface of the elastic substrate (toward 120-*b*). For example, for a flex toward the first surface of the substrate, a resistance R1 would be decreased (decrease in length of element 110-*b*) and resistance R2 would increase (increase in length of element 120-*b*).

Similarly, for the configuration 700 of FIGS. 7A-7C, for a length-wise stretch, a magnitude of stretch may be computed using the equations 1-5 as applied to signals measured from the primary strain-gauge pair 110-*a* and 120-*a* (e.g., the first, second, and third signals).

On the other hand, for a breadth-wise stretch, the deformation analyzer is configured to compute the magnitude of stretch using the equations 1-5 as applied to signals measured from the secondary strain-gauge pair 110-*b* and 120-*b* (e.g., the fourth, fifth, and sixth signals).

FIGS. 7D-7F illustrate a second modified deformation sensor 750 including orthogonal strain-gauge elements (110-*b* and 120-*a*) to detect and disambiguate stretch or flex deformations along two orthogonal directions 710 and 720 (e.g., length-wise versus breadth-wise deformations), according to one or more embodiments.

A deformation sensing apparatus (e.g., the second modified deformation sensor 750) comprises an elastic substrate 130, a first strain-gauge element 110-*b* formed on a first surface of the elastic substrate 130, and configured to output a first signal (indicative of a resistance of the first strain-gauge element 110-*b*) in response to a strain applied in a first direction 710; and a second strain-gauge element 120-*a* formed on a second surface of the elastic substrate 130 opposite to the first surface, and configured to output a second signal (indicative of a resistance of the first strain-gauge element 120-*a*) in response to a strain applied in a second direction 720. The deformation sensing apparatus 750 is configured to output a third signal (indicative of a capacitance of the elastic substrate 130 measured between the first and second strain-gauge elements 110-*b* and 120-*a*) responsive to an applied deformation, the third signal being measurable between a terminal of the first strain-gauge element 110-*b* and a terminal of the second strain-gauge element 120-*a*. The first direction 710 is orthogonal to the second direction 720. The first strain-gauge element 110-*b* and the second strain-gauge element 120-*a* are mutually orthogonal.

In such embodiments, the deformation analyzer is further configured to determine a direction of stretch deformation as being either a stretch in the first direction 710 or in the second direction 720 by comparing magnitudes of the first and second signals detected from the first and second strain-gauge elements 110-b and 120-a. For a stretch in the first direction 710, the deformation analyzer is configured to compute a magnitude of stretch using the first and third signals; and for a stretch in the second direction 720, the deformation analyzer is configured to compute the magnitude of stretch using the second and third signals.

For example, for a stretch in the first direction 710, a magnitude of stretch may be computed using the equations 1-5 as applied to signals measured from the second and third signals measured from the first and second strain-gauge elements 110-b and 120-a.

On the other hand, for a stretch in the second direction 720, the deformation analyzer is configured to compute the magnitude of stretch using the equations 1-5 as applied to signals measured from the second and third signals measured from the first and second strain-gauge elements 110-b and 120-a.

Additionally, the deformation analyzer is further configured to determine a direction of flex deformation as being either a bend in the first direction 710 or in the second direction 720 by comparing magnitudes of the first and second signals detected from the first and second strain-gauge elements 110-b and 120-a. For a bend in the first direction 710, the deformation analyzer is configured to compute a magnitude of bend using the first and third signals; and for a bend in the second direction 720, the deformation analyzer is configured to compute a magnitude of bend using the second and third signals.

For example, for a bending arc along the first direction 710 (along lengths of the leads of the first strain-gauge element 110-b, as illustrated in FIGS. 7B-7C), the magnitude of flex may be computed using the equations 6-8 as applied to the first and third signals obtained from the first and second strain-gauges 110-b and 120-a.

Conversely, for a bending arc along the second direction 720 (along lengths of the leads of the second strain-gauge element 120-a), the magnitude of flex is computed using the equations 6-8 as applied to the second and third signals obtained from the first and second strain-gauges 110-b and 120-a.

FIGS. 8-11 illustrate examples of wearable systems that include one or more deformation sensing apparatuses, according to one or more embodiments.

In one or more embodiments, a wearable device or system comprises one or more deformation sensors (such as those explained with reference to FIGS. 1-7). The wearable device or system may also include the measurement circuit and deformation analyzer (explained with reference to FIG. 3). Alternatively, the wearable device may include the deformation sensor (and optionally the measurement circuit) and the first, second, and third signals may be sent to a remote (e.g., non-wearable) system or device; the remote system or device may include the measurement circuit and/or the deformation analyzer.

In some embodiments, each of the first and second strain-gauge elements of the deformation sensor within the wearable device has a horse-shoe shape comprising an arcuate head and a pair of elongate leads extending from ends of the arcuate head (as explained with reference to FIG. 3). In such embodiments, alignment of the shapes of the first and second strain-gauge elements correspond and these aligned shapes are configured to circumscribe or surround an articulating joint. As a result, when the wearable device is positioned or worn around the joint, a movement of the joint results in a corresponding deformation of the deformation sensor and a generation of the first, second, and third signals responsive to the deformation. Then, using the approaches described herein, a measure of stretch deformation and flex deformation of the joint can be determined based on the first, second, and third signals.

Figure 8:
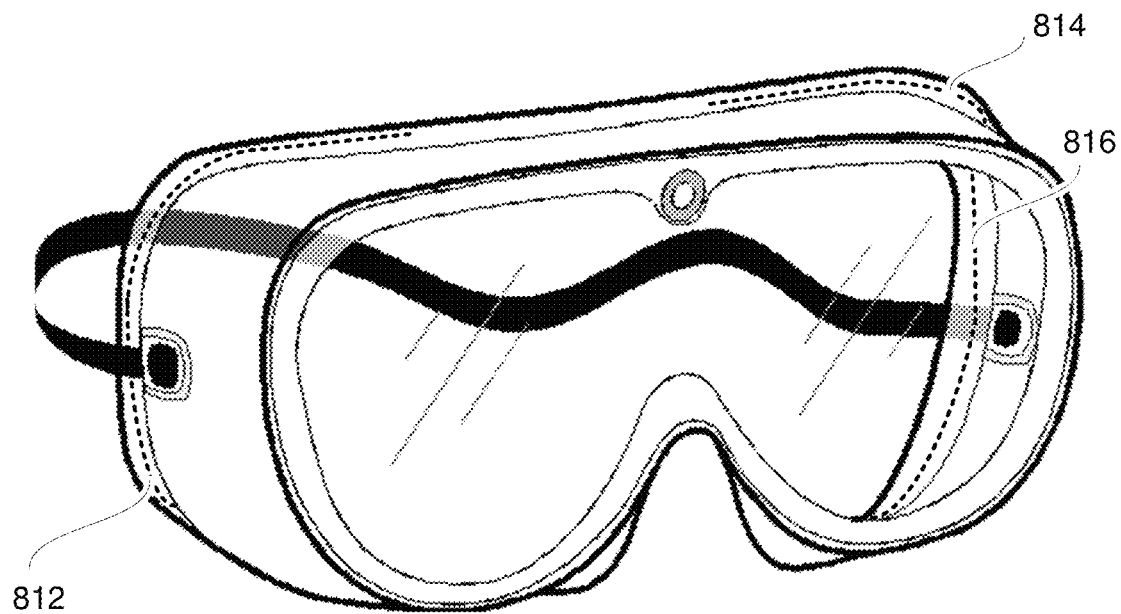
FIGS. 8-11 illustrate examples of wearable systems that include one or more deformation sensing apparatuses, according to one or more embodiments.
Figure 9:
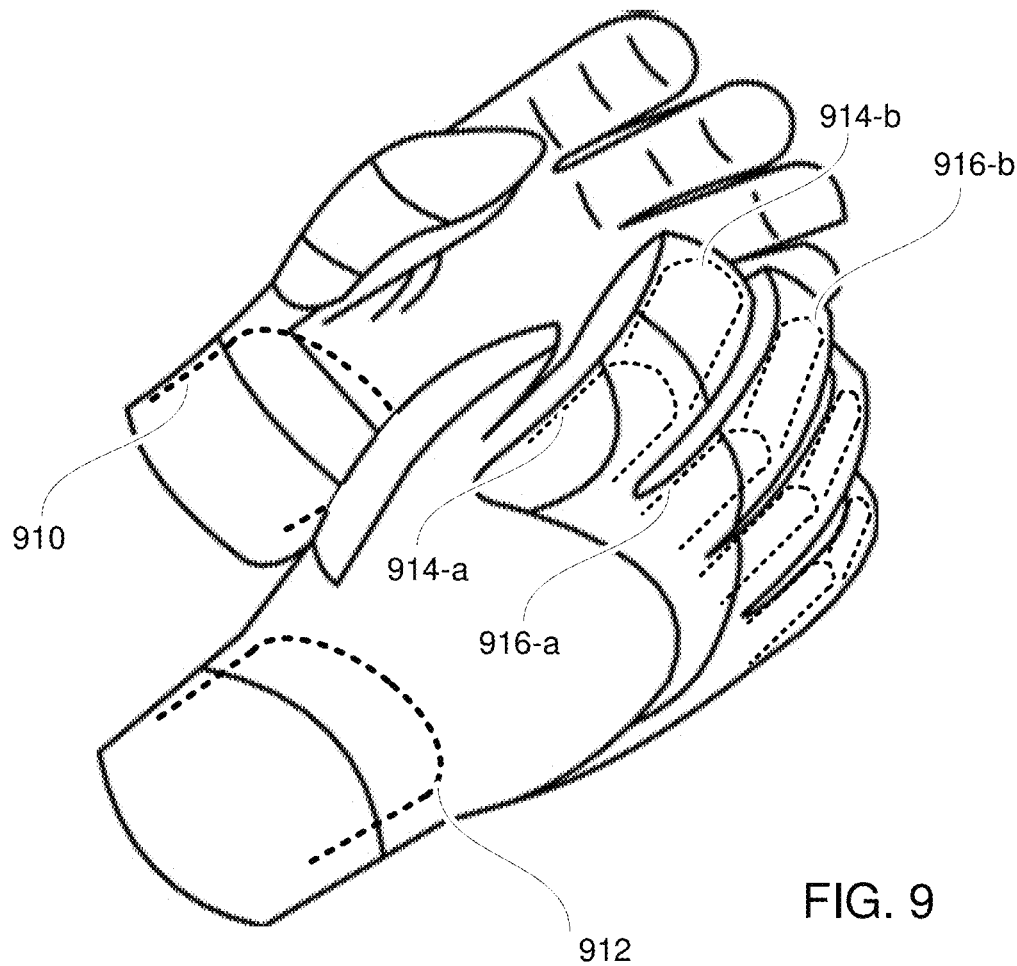
Figure 10:
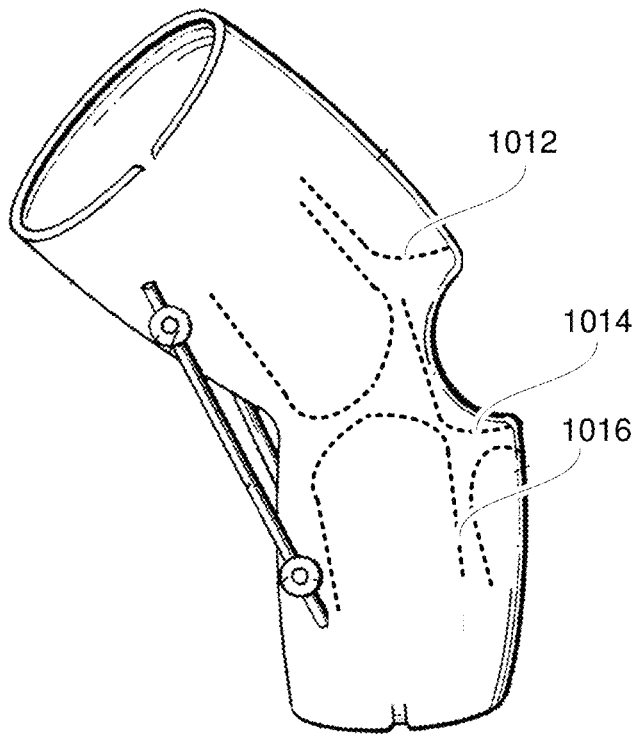

In some embodiments, the wearable device is a wearable headset (e.g., in FIG. 8) to be worn around a portion of the face. Correspondingly, the horse-shoe strain-gauges 812, 814, 816 are arranged to be substantially concentric with (circumscribing) sockets of the eyes or aligned with portions of the forehead and cheek bone as shown in FIG. 8, thus sensing movements of these parts for disambiguation.

In some embodiments, the wearable device is a glove (e.g., in FIG. 9) to be worn around the hand or a cover (e.g., thimble or guard band) to be worn over a finger or wrist. Correspondingly, the horse-shoe strain-gauge is arranged to be substantially concentric with joints of one or more fingers (914-a, 914-b, 916-a, 916-b) or the wrist joint (910 and 912) when the device is worn around the fingers or wrist. Alternatively or in addition, the horse-shoe strain-gauge is arranged to be above, below, or on a side of the joint.

In some embodiments, the wearable device is a brace (e.g., in FIG. 10) to be worn over a knee, elbow, ankle, or shoulder joint. Correspondingly, the arc of the horse-shoe strain-gauge may be arranged to be substantially concentric with the knee (1014), elbow, ankle, or shoulder joint. Alternatively, or in addition, the horse-shoe strain-gauge may be arranged to be above (1012), below (1016), or on a side (1016) of the joint.

Figure 11:
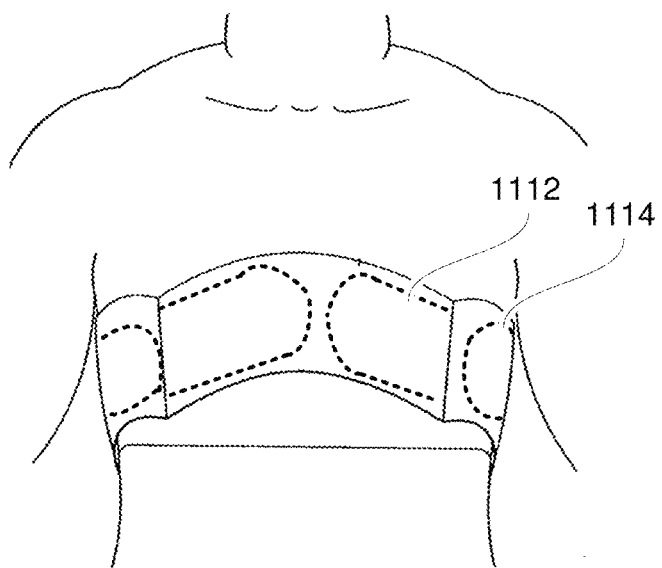

In some embodiments, the wearable device is a support brace to be worn over a neck or torso part (e.g., chest, back, or waist; as shown in FIG. 11). Correspondingly, the horse-shoe strain-gauge is arranged to be follow a contour of the neck or torso part (e.g., 1112 or 1114).

FIG. 12 includes a flowchart illustrating a method 1200 of sensing deformation using the deformation sensing apparatuses disclosed herein, according to one or more embodiments. The method comprises, in response to an applied deformation, performing steps 1210-1230. The method includes, measuring 1210 a first signal from a first strain-gauge element (e.g., element 110 described with reference to FIGS. 1-7) formed on a first surface of an elastic substrate (e.g., substrate 130 described with reference to FIGS. 1-7) of the deformation sensor (e.g., deformation sensor 110). In some embodiments, the first signal is indicative of a resistance (e.g., R1 or resistance change $\Delta R1$) of the first strain-gauge element.

The method further comprises measuring 1220 a second signal from a second strain-gauge element (e.g., element 120 described with reference to FIGS. 1-7) formed on a second surface of the elastic substrate of the deformation sensor. In some embodiments, the second signal is indicative of a resistance (R2 or resistance change $\Delta R2$) of the second strain-gauge element.

The method further comprises measuring 1230 a third signal between the first strain-gauge element and the second strain-gauge element. In some embodiments, the third signal is indicative of a capacitance (C or capacitance change $\Delta C$) across the elastic substrate measured responsive to the applied deformation.

The method additionally comprises computing 1240 a measure (direction and/or magnitude) of stretch deformation and a measure (direction and/or magnitude) of flex deformation of the deformation sensor, in the applied deformation, based on the measured first signal from the first strain-gauge element, the measured second signal of the second strain-gauge element, and the third signal.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments, which is set forth in the following claims.

What is claimed is:

1. A deformation sensing apparatus comprising:
a substrate;
a first strain-gauge element coupled to a first portion of the substrate, and configured to output a first signal in response to a strain applied in a first direction; and
a second strain-gauge element coupled to a second portion of the substrate distinct from the first portion, and configured to output a second signal in response to a strain applied in the same first direction, and
wherein the deformation sensing apparatus is further configured to output a third signal responsive to an applied deformation, the third signal being measureable between a terminal of the first strain-gauge element and a terminal of the second strain gauge-element.

2. The deformation sensing apparatus of claim 1, wherein the first portion of the substrate is opposite to the second portion of the substrate.

3. The deformation sensing apparatus of claim 1, wherein the first portion of the substrate is a top portion of the substrate and the second portion of the substrate is a bottom portion of the substrate.

4. The deformation sensing apparatus of claim 1, wherein:
the first strain-gauge element has two distinct terminals, a first terminal and a second terminal;
the first signal is measurable across the first and second terminals of the first strain-gauge element;
the second strain-gauge element has two distinct terminals, a third terminal and a fourth terminal; and
the second signal is measurable across the third and fourth terminals of the second strain-gauge element.

5. The deformation sensing apparatus of claim 1, wherein the substrate comprises a flexible, electrically-insulating dielectric material.

6. The deformation sensing apparatus of claim 5, wherein:
each of the first and second strain-gauge elements has a horse-shoe shape comprising an arcuate head and a pair of elongate leads extending from ends of the arcuate head;
alignment of the shapes of the first and second strain-gauge elements correspond along an axis orthogonal to the first portion and the second portion of the substrate;
central axes of the first and second strain-gauge elements are aligned parallel and coplanar to each other along a planes orthogonal to the first portion and the second portion of the substrate; and
corresponding leads of the pairs of elongate leads of the first and second strain-gauge elements are respectively length-wise parallel and have substantially the same dimensions.

7. The deformation sensing apparatus of claim 6, wherein:
a measurement circuit configured to measure the first signal from the first strain-gauge element and the second signal from the second strain-gauge element in response to an applied deformation; and
a deformation analyzer configured to compute a measure of stretch deformation and a measure of flex deformation of the sensing apparatus, in the applied deformation, based on the measured first signal from the first strain-gauge element, the measured second signal of the second strain-gauge element, and the third signal.

8. The deformation sensing apparatus of claim 7, wherein:
the measure of stretch deformation is indicative of an average change in lengths in relationship to an undeformed length of the first and second strain gauge elements; and
the measure of flex deformation is indicative of a bend radius of an angular bend of portions of the substrate on which the first and second strain-gauge elements are formed.

9. The deformation sensing apparatus of claim 7, wherein the deformation analyzer is further configured to determine whether the stretch deformation corresponds to a compression stretch or an elongation stretch, by comparing the measured first, second, and third signals, based on a sign of changes in resistances of the first and second strain gauge elements and a sign of change in capacitance of the substrate.

10. The deformation sensing apparatus of claim 1, further comprising:
a measurement circuit configured to measure the first signal from the first strain-gauge element and the second signal from the second strain-gauge element in response to the applied deformation; and
a deformation analyzer configured to compute a measure of stretch deformation and a measure of flex deformation of the sensing apparatus, in the applied deformation, based on the measured first signal from the first strain-gauge element, the measured second signal of the second strain-gauge element, and the third signal.

11. The deformation sensing apparatus of claim 10, wherein:
the first signal is indicative of a first resistance of the first strain-gauge element;
the second signal is indicative of a second resistance of the second strain-gauge element; and
the third signal is indicative of a capacitance across the substrate measured responsive to the applied deformation.

12. The deformation sensing apparatus of claim 11, wherein the deformation analyzer computes the measure of stretch deformation as a proportion of length change (($\Delta L$)/$L_0$) of the first and second strain-gauge elements, based on the first, second, and third signals, using the equations:

$$R_1 = R_2 = R_0 + (GF \cdot \Delta L)$$

$$C = \varepsilon \frac{\text{Area}}{\text{gap}} = \varepsilon = \frac{L_0 \cdot W_0}{g} = \varepsilon \frac{L_0 \cdot W_0}{(g_0 - \Delta L \cdot \gamma)} = \varepsilon \frac{L_0 \cdot W_0}{\left(g_0 - \left(\frac{\Delta L_1 + \Delta L_2}{2}\right)\right)},$$

where R1 is the first resistance, R2 is the second resistance, C is the capacitance, and
Area is an overlap between first and second strain-gauge elements,
GF is a Gauge Factor relating strain and resistance,
$\gamma$ is a Poisson's Ratio of the substrate relating deformations between axes, $L_0$ is an undeformed length of the first and second strain-gauge elements, $\Delta L$, $\Delta L_1$, $\Delta L_2$ are length changes of the first and second strain-gauge elements, $W_0$ is an undeformed length of the first and second strain-gauge elements, $\varepsilon$ is a dielectric constant of the substrate, $R_0$ is a baseline resistance of the first and second strain-gauge elements, and g, $g_0$ are, respectively, deformed and baseline widths of the substrate.

13. The deformation sensing apparatus of claim 11, wherein the deformation analyzer computes the measure of flex deformation as bend radii of the first and second strain-gauge elements, based on the first, second, and third signals, using the equations:

$$R_1 = R_0 + (GF \cdot \Delta L_1) \approx R_0 + \left(\frac{g}{2\rho_1} \cdot GF\right)$$

$$R_2 = R_0 + (GF \cdot \Delta L_2) \approx R_0 + \left(\frac{-g}{2\rho_2} \cdot GF\right),$$

where R1 is the first resistance, R2 is the second resistance, and

GF is a Gauge Factor relating strain and resistance of the first and second strain-gauge elements, γ is a Poisson's Ratio of the substrate relating deformations between axes, $L_0$ is an undeformed length of the first and second strain-gauge elements, $\Delta L_1$, $\Delta L_2$ are length changes of the first and second strain-gauge elements, $R_0$ is a baseline resistance of the first and second strain-gauge elements, g, is a deformed width of the substrate, and $\rho_1$ and $\rho_2$ are bend radii of the first portion and the second portion of the substrate.

14. A system comprising:
one or more deformation sensors, each including:
   a substrate;
   a first strain-gauge element coupled to first portion of the substrate, and configured to output a first signal in response to a strain applied in a first direction; and
   a second strain-gauge element coupled to a second portion of the substrate opposite to the first portion, and configured to output a second signal in response to a strain applied in the same first direction,
   wherein the deformation sensor is configured to output a third signal responsive to an applied deformation, the third signal being measurable between one of the first and second terminals of the first strain-gauge element and one of the third and fourth terminals of the second strain-gauge element;
a measurement circuit configured to measure the first signal from the first strain-gauge element and the second signal from the second strain-gauge element in response to the applied deformation; and
a deformation analyzer configured to compute a measure of stretch deformation and a measure of flex deformation of the sensing apparatus, in the applied deformation, based on the measured first signal from the first strain-gauge element, the measured second signal of the second strain-gauge element, and the third signal.

15. The system of claim 14, wherein:
each of the first and second strain-gauge elements of the deformation sensor has a horse-shoe shape comprising an arcuate head and a pair of elongate leads extending from ends of the arcuate head; and
alignment of the shapes of the first and second strain-gauge elements correspond and the shapes are configured to circumscribe an articulating joint, a movement of the joint resulting in a corresponding deformation of the deformation sensor.

16. The system of claim 14, wherein the one or more deformation sensors are included in a wearable device.

17. The system of claim 14, wherein the one or more deformation sensors are included in a glove.

18. The system of claim 17, wherein the one or more deformation sensors are included in a finger of the glove.

19. The system of claim 17, wherein the one or more deformation sensors comprise a plurality of deformation sensors, each included in a different finger of the glove.

20. A method of sensing deformation of a deformation sensor, comprising, in response to an applied deformation:
   measuring a first signal from a first strain-gauge element coupled to a first portion of an substrate of the deformation sensor, the first signal indicative of a resistance of the first strain-gauge element;
   measuring a second signal from a second strain-gauge element coupled to a second portion of the substrate of the deformation sensor, the second signal indicative of a resistance of the second strain-gauge element;
   measuring a third signal between the first strain-gauge element and the second strain-gauge element, the third signal indicative of a capacitance across the substrate measured responsive to the applied deformation; and
   computing a measure of stretch deformation and a measure of flex deformation of the deformation sensor, in the applied deformation, based on the measured first signal from the first strain-gauge element, the measured second signal of the second strain-gauge element, and the third signal.

* * * * *